(12) United States Patent
Saffioti

(10) Patent No.: US 10,994,445 B2
(45) Date of Patent: May 4, 2021

(54) SYSTEM AND METHOD FOR PRODUCING HOMOGENIZED OILFIELD GELS

(71) Applicant: Kirby Corporation, Houston, TX (US)

(72) Inventor: Stephen M. Saffioti, Houston, TX (US)

(73) Assignee: STEWART & STEVENSON LLC, Houston, TX (US)

(*) Notice: Subject to any disclaimer, the term of this patent is extended or adjusted under 35 U.S.C. 154(b) by 0 days.

(21) Appl. No.: 15/706,488

(22) Filed: Sep. 15, 2017

(65) Prior Publication Data

US 2018/0001513 A1 Jan. 4, 2018

Related U.S. Application Data

(63) Continuation of application No. 13/705,946, filed on Dec. 5, 2012, now Pat. No. 9,764,497.

(Continued)

(51) Int. Cl.
| | |
|---|---|
| *B29B 7/60* | (2006.01) |
| *B01F 5/04* | (2006.01) |
| *B01F 5/06* | (2006.01) |
| *B01F 5/10* | (2006.01) |
| *B01F 13/00* | (2006.01) |

(Continued)

(52) U.S. Cl.
CPC ............ *B29B 7/60* (2013.01); *B01F 3/1228* (2013.01); *B01F 5/0415* (2013.01); *B01F 5/0606* (2013.01); *B01F 5/106* (2013.01); *B01F 13/004* (2013.01); *B01F 15/0251* (2013.01); *B01F 2215/0081* (2013.01)

(58) Field of Classification Search
CPC ............ B01F 3/1228; B01F 2215/0081; B01F 5/0415; B01F 5/0606; B01F 5/106; B01F 13/004; B01F 15/0251; B29B 7/60
See application file for complete search history.

(56) References Cited

U.S. PATENT DOCUMENTS

| | | | |
|---|---|---|---|
| 5,981,446 A | 11/1999 | Qiu et al. | |
| 7,794,135 B2 * | 9/2010 | El Kholy | B01F 3/1271 366/141 |

(Continued)

FOREIGN PATENT DOCUMENTS

| | | |
|---|---|---|
| CN | 1612906 A | 5/2005 |
| CN | 201223776 Y | 4/2009 |
| CN | 104053340 A | 9/2014 |

OTHER PUBLICATIONS

Office Action Issued in CN Application No. 2018112670021, dated Dec. 15, 2020, 17 pages.

*Primary Examiner* — Anshu Bhatia
(74) *Attorney, Agent, or Firm* — Locklar PLLC

(57) ABSTRACT

A system for producing homogenized oil field gel including a power unit, a control system, a feed tank, a hopper, and a piping assembly that includes inlet and outlet manifolds, centrifugal pumps, and metering devices for filling the feed tank and handling a discharge of oilfield gel. The system further includes a powder hydration component and liquid chemical equipment. The method for producing homogenized oil field gel includes a guar powder procedure including a controlled sequence for starting and stopping a venturi mixer in a hydration unit. The method for producing homogenized oil field gel further includes a liquefied gel concentrate procedure including a metering and chemical injection procedure for mixing a liquefied gel concentrate.

7 Claims, 4 Drawing Sheets

Related U.S. Application Data

(60) Provisional application No. 61/566,958, filed on Dec. 5, 2011.

(51) Int. Cl.
*B01F 15/02* (2006.01)
*B01F 3/12* (2006.01)

(56) References Cited

U.S. PATENT DOCUMENTS

| | | | | |
|---|---|---|---|---|
| 8,899,823 | B2* | 12/2014 | Oldham | C09K 8/62 366/136 |
| 2004/0218463 | A1 | 11/2004 | Allen | |
| 2006/0107998 | A1* | 5/2006 | Kholy | B01F 5/043 137/3 |
| 2014/0328137 | A1* | 11/2014 | Lauder | B01F 5/061 366/152.2 |

* cited by examiner

SYSTEM AND METHOD FOR PRODUCING HOMOGENIZED OILFIELD GELS

CROSS-REFERENCE TO RELATED APPLICATIONS

This application claims priority to and is a continuation of U.S. patent application Ser. No. 13/705,946, filed Dec. 5, 2012, which claims priority to U.S. Provisional Patent Application No. 61/566,958, filed Dec. 5, 2011, each of which is hereby incorporated by reference in its entirety for all purposes.

FEDERALLY SPONSORED RESEARCH OR DEVELOPMENT

This application is not the subject of any federally sponsored research or development.

THE NAMES OF THE PARTIES TO A JOINT RESEARCH AGREEMENT

There have been no joint research agreements entered into with any third parties.

BACKGROUND OF THE INVENTION

1. Field of the Invention

The embodiments of the present invention relate to a system and method for producing high quality homogenized oilfield gels from traditional liquefied gel concentrates (LGC) and guar gum powder.

2. Description of the Related Art

Prior art systems for generating oilfield gels generally rely on LGCs due to the difficulty of hydrating guar gum powder, where, if each particle of powder is not thoroughly wetted, unwanted agglomerates ("gel balls") can form in the mixture, reducing the overall yield and requiring high energy, high shear processing, which is usually unsuccessful.

There are several advantages to using dry guar powder, including cost, environmental, and transport benefits. LCGs were previously created by suspending guar (or another polymer) in petroleum based products so that they could be pumped and blended with water. Due to environmental concerns stemming from the use and disposal of fracturing fluids, the petroleum products were replaced with natural mineral oils. However, these natural mineral oils are in short supply, are costly, and any fluid used for suspension adds a significant amount of weight to the total materials needing to be delivered to the site. Dry guar powder requires nothing for suspension, thus it is less expensive, weighs less, and is more easily transported.

There exists a need for dry powder handling and hydration systems that produce functional oilfield gel "on-the-fly" without recirculation, agglomerates, or damaging high shear processes.

SUMMARY OF THE INVENTION

The embodiments of the present invention include a system for producing oil field gel including a power unit including an engine, pumps, and all requisite auxiliary components for providing hydraulic power. The system for producing oil field gel further includes a control system, a feed tank comprising a plurality of chambers, and a hopper. The system for producing oil field gel further includes a piping assembly that includes inlet and outlet manifolds, centrifugal pumps, and metering devices for filling the feed tank and handling a discharge of oilfield gel. Further, the system for producing oil field gel includes a powder hydration component with a venturi mixing system, and liquid chemical equipment.

Another embodiment of the present invention is directed to a method for producing oil field gel including: metering dry guar powder using an agitated hopper and a metering dispenser; dispensing known volumes of guar powder to a pickup funnel; hydrating the guar powder using a hydration tank, where the hydration tank includes a reservoir of fresh water; supplying water from the reservoir by a first centrifugal pump into a first chamber; delivering water to an eductor device by a second centrifugal pump creating a vacuum via the eductor device forcing enough water through the system; closing a vacuum interrupter valve thereby creating a vacuum in a powder conveyance line; delivering powder to the pickup funnel by the dispenser; hydrating the powder creating gel; and discharging the gel into a second chamber of the hydration tank.

The embodiments of the present invention further include a hydration unit including an agitated hopper, a metering dispenser, a hydration tank, an eductor device, at least one centrifugal pump, a pressure gauge or transducer, a vacuum interrupter valve, a powder conveyance line, a pick-up funnel, at least one chamber, and an integrated sump.

BRIEF DESCRIPTION OF THE DRAWINGS

Preferred features of the embodiments of the present invention are disclosed in the accompanying drawings, wherein similar reference characters denote similar elements throughout the several views, and wherein.

DETAILED DESCRIPTION

Figure 1:
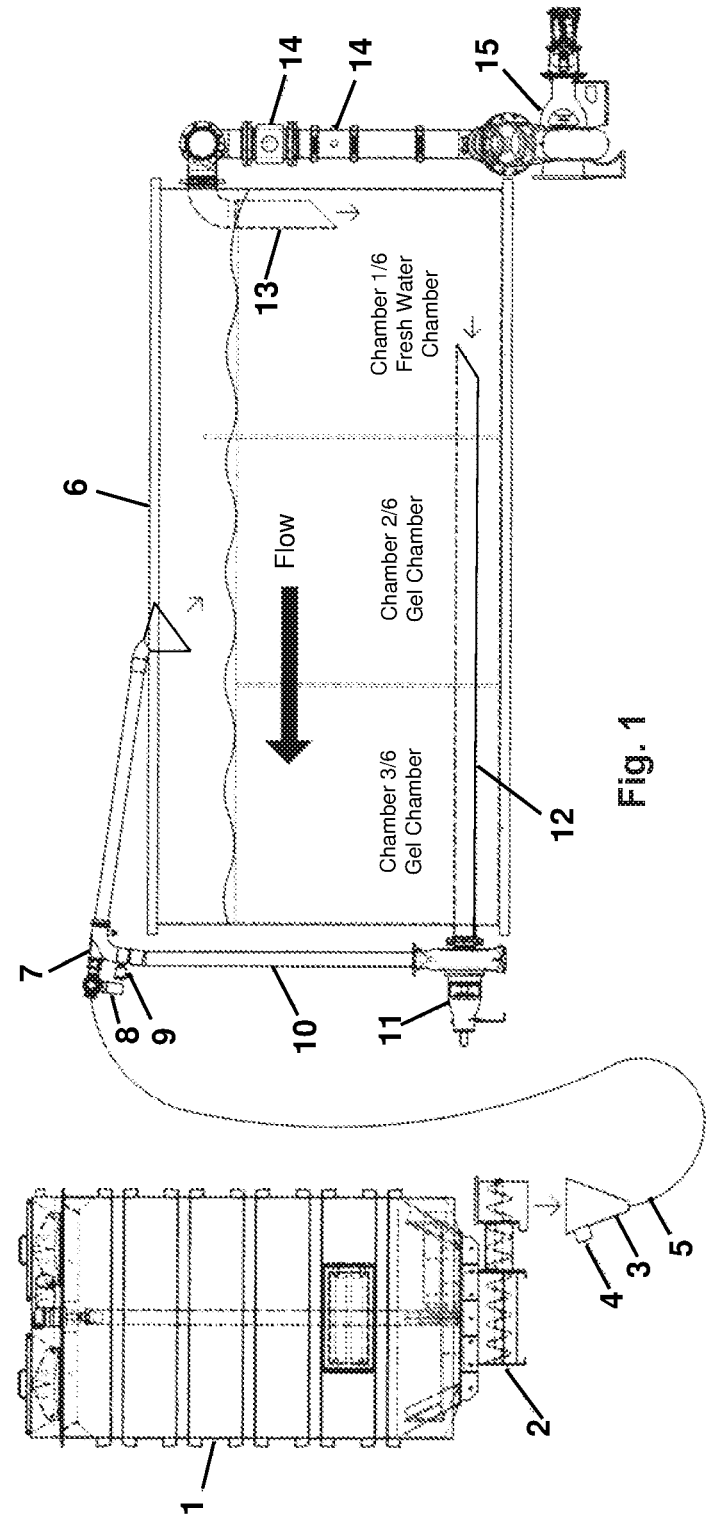
FIG. 1 is a side view of equipment for producing oilfield gels according to an embodiment of the present invention.

The embodiments of the present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete and will convey the scope of the invention to those skilled in the art.

In the following description, like reference characters designate like or corresponding parts throughout the figures. Additionally, in the following description, it is understood that terms such as "top," "bottom," "upper," "lower," "first," "second" and the like, are words of convenience and are not to be construed as limiting terms.

This application also hereby incorporates by reference the following prior art U.S. patents and published patent applications that include subject matter related to the aspects of the embodiments of the present invention as described herein: U.S. Pat. No. 7,048,432 ("Method and Apparatus for Hydrating a Gel for Use in Subterranean Formation"; issue date of May 23, 2006); U.S. Pat. No. 7,794,135 ("Dry Polymer Hydration Apparatus and Methods of Use"; issue date of Sep. 14, 2010); U.S. Patent Application Publication No. 2008/0264641 ("Blending Fracturing Gel"); U.S. Patent Application Publication No. 2004/0008571 ("Apparatus and Method for Accelerating Hydration of Particulate Polymer"); U.S. Pat. No. 5,382,411 ("Apparatus and Method for Continuously Mixing Fluids"; issue date of Jan. 17, 1995); U.S. Pat. No. 5,334,788 ("Reaction of Substrate Compounds with Fluorine in an Eductor"; issue date of Aug. 2, 1994); U.S. Pat. No. 7,794,135 ("Dry Polymer Hydration Apparatus and Methods of Use"; issue date of Sep. 14, 2010); U.S. Pat. No. 5,426,137 ("Method for Continuously Mixing Fluids"; issue date of Jun. 20, 1995); U.S. Pat. No. 5,344,619 ("Apparatus for Dissolving Dry Polymer"; issue date of Sep. 6, 1994); U.S. Pat. No. 5,447,394 ("Automatic Flushing Apparatus for a Hydrator"; issue date of Sep. 5, 1995); U.S. Pat. No. 6,817,376 ("Gel Hydration Tank and Method"; issue date of Nov. 16, 2004); and U.S. Pat. No. 5,190,374 ("Method and Apparatus for Continuously Mixing Well Treatment Fluids"; issue date of Mar. 2, 1993).

An embodiment of the present invention includes onboard dry powder handling and hydration systems that produce functional oilfield gel "on-the-fly" without recirculation, agglomerates, or damaging high shear processes. The capability of the embodiments of the present invention will improve this portion of fracturing operations worldwide.

For market acceptance considerations, in an embodiment of the present invention, the ability to produce oilfield gel from LGCs is maintained.

The embodiments of the present invention include a power unit. The power unit in an embodiment of the present invention includes a diesel engine, hydraulic pumps, and all requisite auxiliary components. The power unit in an embodiment of the present invention provides system hydraulic power.

The embodiments of the present invention include a feed tank. The feed tank in a preferred embodiment of the present invention includes a 180-barrel capacity steel tank (or the like) for making and storing functional oilfield gel. One of ordinary skill in the art will understand that the feed tank is not limited to a 180-barrel tank, but may be smaller or larger taking into account many factors including application. The feed tank in an embodiment of the present invention includes a clean water chamber for more precise metering, and encourages cleaning of the venturi mixer and components (to empty the unit out at the end of a job, tank 1 is emptied through the venturi mixer, which will encourage cleaning).

As shown in FIG. 1, for mixing the liquefied component, retaining the ability to work with the LGC is made possible through the plurality of chambers that are included in the feed tank. The embodiment shown in FIG. 1 includes six tanks, where the tanks provide dwell time to give the gel an adequate time period to hydrate. Chamber 1 is dedicated as the clean chamber in an embodiment of the present invention.

The embodiments of the present invention include a hopper. The hopper in a preferred embodiment of the present invention includes a 10,000 lb. capacity powder tank (or the like) with agitators, a sump, and a conveyance screw specifically designed for metering and dispensing dry guar powder. One of ordinary skill in the art will understand that the hopper is not limited to a 10,000 lb. capacity powder tank, but may be smaller or larger taking into account many factors including application. One of ordinary skill in the art will also understand that other means for metering other than the conveyance screw may be provided in the embodiments of the present invention. Additionally, the shape of the hopper is not limited to what is shown in the accompanying figures. Examples of agitators include, but are not limited to, paddles, vibrators, rotating devices, and the like.

The embodiments of the present invention include a piping assembly. The piping assembly in an embodiment of the present invention includes inlet and outlet fluid manifolds, centrifugal pumps, and metering devices for filling the feed tank and handling discharge of oilfield gel. As shown in FIG. 1, the piping assembly may include a pressurized fresh water supply pipe 10, a centrifugal pump 11, and a fresh water supply pipe 12.

The embodiments of the present invention allow for the use of dry powdered gel, rather than slurry or liquid gel. The powder hydration component group allows for a dual slurry/powder or powder unit. The embodiments of the present invention include a powder hydration component group. The powder hydration component group in an embodiment of the present invention includes a venturi mixing system that uses pressurized water for creating a vacuum and wetting a dry polymer. The powder hydration component group in an embodiment of the present invention includes a vacuum break valve, pressure transducer or switch, centrifugal pump, pneumatic conveyance line, and pickup funnel. Additionally, the powder hydration component group may include a flow meter.

The embodiments of the present invention include a liquid chemical equipment group. The liquid chemical equipment group in an embodiment of the present invention includes chemical pumps, metering devices, and hosing for adding liquid chemicals to a functional gel or for making a functional gel from liquid concentrate.

Figure 3:
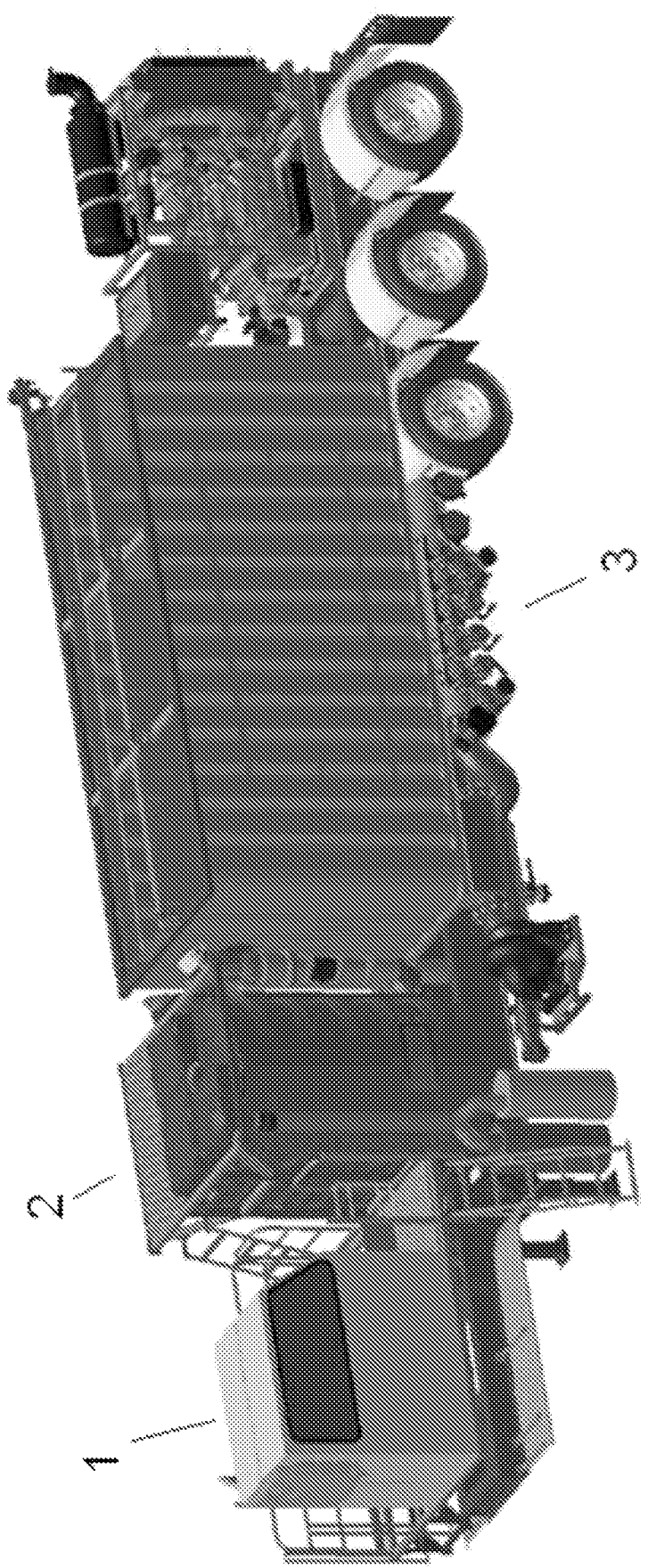
FIG. 3 is a perspective view of a system for producing oilfield gels according to an embodiment of the present invention.

The embodiments of the present invention may include a platform and cabin. The platform and cabin in an embodiment of the present invention provide a comfortable environment for operators, and a safe pathway from the controls to the feed tank, powder hopper, and mixing devices. FIG. 3 shows an entire system according to a preferred embodiment of the present invention. In FIG. 3, the operator cabin is shown as element 1, the walkway/access platform is shown as element 2, and the manifold system is shown as element 3.

The embodiments of the present invention also may include several procedures for producing homogenized oilfield gels. In particular, an embodiment of the present invention includes a guar powder procedure. The guar powder procedure in an embodiment of the present invention includes a controlled sequence (which may be handled by a programmable logic controller, or relay logic) for starting and stopping the venturi mixer. This sequence may be handled automatically as a means of avoiding a failure mode of the mixer.

An embodiment of the present invention includes a LGC procedure. The LGC procedure of an embodiment of the present invention includes a metering and chemical injection procedure for mixing LGC, other chemicals, and/or water at the correct ratios.

The embodiments of the present invention each contribute to the procedures that are created to ensure correct chemical ratios and to avoid mixer failure modes. In an embodiment of the present invention, an automatic control system (programmable control system) allows an operator to achieve the desired chemical ratios.

Other features of the embodiments of the present invention include a venturi mixing system. Additionally, the embodiments of the present invention include a control system, an interface, and graphical control interface (such as Stewart & Stevenson's "ACCUFRAC"). The embodiments of the present invention may also include a guar powder hopper, a revised feed tank with clean water chamber, a power unit concept, and a chemical additive components and processes.

Additional detail of an embodiment of the present invention and the process and related flow path of an embodiment of the present invention will now be described.

The hydration unit of the embodiments of the present invention is designed to produce high quality, homogenized oilfield gels from both traditional, liquefied gel concentrates (LGC) and guar gel powder. Prior art systems for generating oilfield gels generally rely on LGCs due to the difficulty of hydrating guar powder; if each particle of powder is not thoroughly wetted, unwanted agglomerates ("gel balls" of "fish eyes") usually form in the mixture which reduce the overall yield and require usually unsuccessful high energy, high shear processing. Further, LCGs typically use either a hydrocarbon-based carrier fluid or mineral oil for polymer suspension. Mineral oil adds significant cost to the production of oilfield gel, and hydrocarbon-based fluids require careful handling and disposal because they are hazardous to the environment. Another advantage of the embodiments of the present invention is the transportation and storage cost. For example, the powder can be stored indefinitely if stored correctly, while the slurry has a shelf life. Additionally, transportation cost with powder is less than with slurry. Another advantage of the embodiments of the present invention is the time to hydrate the powder as opposed to the slurry (no hydrocarbon based molecules need to be removed from the powder that would block water for hydrating).

Onboard dry powder handling and hydration systems of the embodiments of the present invention produce functional, biodegradable oilfield gel "on-the-fly" without recirculation, agglomerates, or damaging high shear processes.

Figure 2:
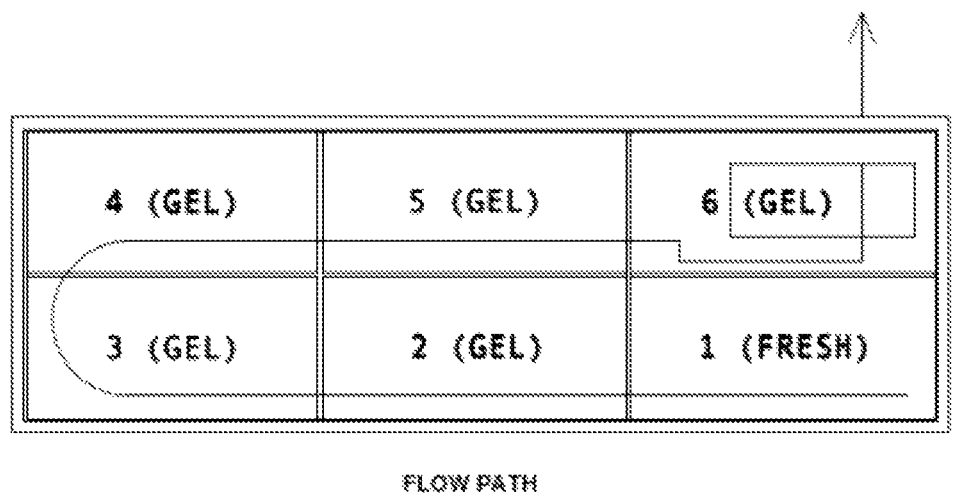
FIG. 2 is a flow path diagram of a system for producing oilfield gels according to an embodiment of the present invention.

The equipment and processes for producing oilfield gels from powdered guar gum are described herein, and examples are shown in FIGS. 1 and 2. FIG. 1 shows an agitated guar powder hopper 1, a metered auger powder dispenser 2, a powder pickup funnel 3, a vibrator 4, a powder pneumatic conveyance hose 5, a hydration tank 6, an eductor hydration device 7, a vacuum interrupter valve 8, a pressure transducer 9, a pressurized fresh water supply pipe 10, a centrifugal pump 11, a fresh water supply pipe 12, a metered fresh water tank inlet pipe 13, a flow meter 14, and a centrifugal pump 15.

Figure 4:
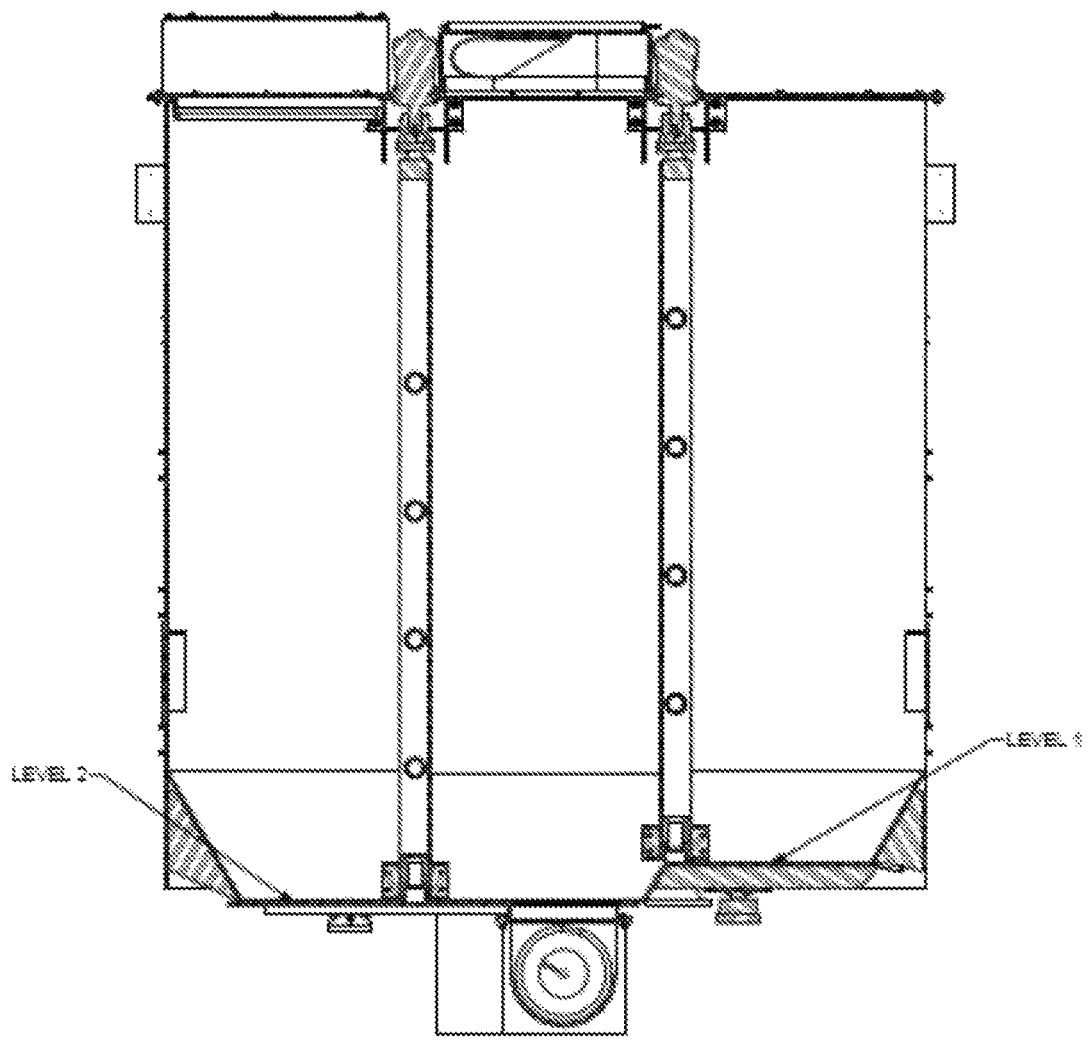
FIG. 4 is a side view of the bi-level floor of the hopper in cross section of a system for producing oilfield gels according to an embodiment of the present invention.

Dry guar is stored and precisely metered by an assembly comprised of items 1 and 2 depicted in FIG. 1. Item 1 is an agitated hopper designed to promote positive flow of guar powder to the metering dispenser 2. In an embodiment of the present invention, the hopper 1 is designed with an obstruction free interior to prevent powder accumulation, agitation paddles to prevent bridging and to force powder into the dispenser, and a split-level conical floor to maximize paddle effectiveness. The split-level conical floor may include an agitator (e.g., a sweeper or a plurality of sweepers on each level). See FIG. 4.

An obstruction free interior is made possible by moving the structural members to the outside. The top of the hopper 1 in an embodiment of the present invention features a manual fill hatch if the operator is not able to fill the tank pneumatically, and the sides of the hopper 1 are equipped with hinged doors if the hopper 1 needs to be emptied manually.

In an embodiment of the present invention, the dispenser 2 utilizes a metering auger screw to dispense known volumes of guar powder to the pickup funnel 3. The volumetric flow rate of powder can be controlled by computer or manually by manipulating the angular velocity of the auger shaft. One of ordinary skill will appreciate that the screw auger delivery system may be replaced by other known delivery systems in embodiments of the present invention.

The hydration tank 6 in an embodiment of the present invention is preferably a six-chamber, 200 barrel capacity tank (or the like) designed for preparing oilfield gels either from LGCs or guar powder. One of ordinary skill in the art will understand that the tank is not limited to a 200-barrel tank, but may be smaller or larger taking into account many factors including application. When using guar powder, the first chamber serves as a reservoir of fresh water. Water is supplied by a centrifugal pump 15, metered by flowmeters 14, and discharged into the first chamber using an inlet pipe 13. The centrifugal pump 15 is the only source of fresh water in the system.

In an embodiment of the present invention, the eductor device 7 functions by forcing enough water through the device to create an internal vacuum. This volumetric flow rate of water is a known constant, and is delivered to the eductor device 7 via a second centrifugal pump 11. In most cases, the volumetric flow rate of water required by the eductor device 7 will be less than the total required gel flow rate. In this condition, the extra fresh water spills over from the first chamber into the second gel chamber, thereby diluting the gel and homogenizing downstream. If less water is drawn into 12 then comes out of 13, then the water just spills over the weir in the two chambers. The figures show a weir or divider between the chambers, which may have spill over or spill under capacities. For example, every other divider may have a spill over weir, or spill under weir.

The pressure drop across the eductor device 7 is monitored by a pressure gauge or transducer 9. When a sufficient vacuum is present, the vacuum interrupter valve 8 can be closed, thereby creating a vacuum in the powder conveyance line 5.

The system is designed to create enough of a vacuum to convey all powder delivered to the pickup funnel 3 by the dispenser 2.

As powder is ingested by the eductor device 7, all particles are hydrated and gel is discharged into chamber two of the hydration tank 6. As previously mentioned, it may be combined with additional fresh water from chamber one for dilution. The hydration tank can be equipped with paddles to promote good circulation, and the shape of the paddles may be such to prevent shearing the material.

As seen from the flow path diagram in FIG. 2, in an embodiment of the present invention, fluid will ultimately pass through at least six chambers before being discharged from the tank. In an embodiment of the present invention, an integrated sump is built into chamber six, where the gel can either be pumped or gravity fed into a manifold for ultimate discharge from the hydration unit. Additionally, paddles may be present.

The embodiments of the present invention may also include auxiliary subsystems. The auxiliary subsystems include a custom dry hopper capable of storing 10,000 lbs of material and designed for the physical properties of guar powder. Additionally, the auxiliary subsystems may include the intuitive, Stewart & Stevenson, LLC "ACCUFRAC" graphical control interface, and a 180 bbl feed tank designed to promote cleaning and maintenance of mixing equipment. In the embodiments of the present invention, the other onboard systems may be the systems that are common to prior art hydration units, and a person skilled in the art would readily understand what is included in these systems.

The embodiments of the present invention also include features to ensure that the right amount of powder with the right amount of water. A preferred embodiment of the present invention includes a system for weighing the hopper. For example, the hopper has a load cell on one side, and a hinge point on the other side. Reading the load cell over time allows for measuring the amount of gel delivered. This is a backup of typical volumetric delivery.

"Guar powder" or "guar gum powder" as used throughout this application includes guar powder as well as any other type of gel powders including natural powder or polymer powder or otherwise synthetic powder or the like in which gels are to be formed thereof.

An example of the start-up and shutdown procedures according to a preferred embodiment of the present invention will now be described.

Startup Procedure:
1. Fill the feed tank;
2. Turn on dry gel mixing system centrifugal pump (FIG. 1, Item 11);
3. Wait for 750 gallons/minute rate through the dry mix system;
4. Close the vacuum break valve (FIG. 1, Item 8); and
5. Begin delivering dry powder to the pickup funnel (FIG. 1, Item 3) according to desired recipe.

Shutdown Procedure:
1. Stop delivering powdered gel to the pickup funnel (FIG. 1, Item 3);
2. Open the vacuum break valve (FIG. 1, Item 8);
3. Flush powder mixing system for at least 2 minutes; and
4. Stop the dry gel mixing system centrifugal pump (FIG. 1, Item 11).

What is claimed is:

1. A method for producing oil field gel comprising:
   metering dry guar powder using an agitated hopper and a metering dispenser;
   dispensing known volumes of guar powder to a pickup funnel;
   hydrating the guar powder using a hydration tank, wherein the hydration tank comprises a reservoir of fresh water;
   supplying water from the reservoir by a first centrifugal pump into a first chamber;
   delivering water to an eductor device by a second centrifugal pump creating a vacuum via the eductor device forcing enough water through the system;
   closing a vacuum interrupter valve thereby creating a vacuum in a powder conveyance line;
   delivering powder to the pickup funnel by the dispenser;
   hydrating the powder creating gel; and
   discharging the gel into a second chamber of the hydration tank.

2. The method according to claim 1, further comprising:
   a guar powder procedure comprising a controlled sequence for starting and stopping a venturi mixer in a hydration unit, the hydration unit comprising:
   the agitated hopper;
   the metering dispenser;
   the hydration tank;
   the eductor device;
   the first or the second centrifugal pump;
   a pressure gauge or transducer;
   the vacuum interrupter valve;
   the powder conveyance line;
   the pick-up funnel;
   the first or the second chamber; and
   an integrated sump; and
   a liquefied gel concentrate procedure comprising a metering and chemical injection procedure for mixing a liquefied gel concentrate.

3. The method according to claim 2, wherein the hydration unit further comprises a venturi mixing system.

4. The method according to claim 2, wherein the hydration unit further comprises a control system.

5. The method according to claim 4, wherein a controlled sequence is handled by a programmable logic controller.

6. The method according to claim 4, wherein the agitated hopper is a guar powder hopper, and wherein the hydration unit further comprises a revised feed tank with a clean water chamber, a power unit, and a chemical additive.

7. The method according to claim 3, wherein the metering dispenser comprises a metering auger screw to dispense known volumes of guar powder.

* * * * *